(12) United States Patent
Layton et al.

(10) Patent No.: US 8,490,207 B2
(45) Date of Patent: Jul. 16, 2013

(54) PERFORMING ZERO-COPY SENDS IN A NETWORKED FILE SYSTEM WITH CRYPTOGRAPHIC SIGNING

(75) Inventors: Jeffrey T. Layton, Raleigh, NC (US); Neil R. T. Horman, Cary, NC (US); Eric L. Paris, Raleigh, NC (US); Josef M. Bacik, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 181 days.

(21) Appl. No.: 13/149,788

(22) Filed: May 31, 2011

(65) Prior Publication Data

US 2012/0311336 A1 Dec. 6, 2012

(51) Int. Cl.
*H04N 7/64* (2006.01)
*G06F 17/30* (2006.01)

(52) U.S. Cl.
USPC ............................. 726/30; 713/164; 713/176

(58) Field of Classification Search
USPC ..................................... 713/164, 176; 726/30
See application file for complete search history.

(56) References Cited

U.S. PATENT DOCUMENTS

| | | | |
|---|---|---|---|
| 6,971,018 B1 * | 11/2005 | Witt et al. | 713/187 |
| 7,620,766 B1 * | 11/2009 | Waldspurger | 711/6 |
| 2010/0223432 A1 * | 9/2010 | Eidus et al. | 711/148 |
| 2012/0159081 A1 * | 6/2012 | Agrawal et al. | 711/141 |

OTHER PUBLICATIONS

Peterson, Zachary. "Data Placement for Copy-on-write Using Virtual Contiguity", Sep. 2002.*

* cited by examiner

*Primary Examiner* — Michael Simitoski
(74) *Attorney, Agent, or Firm* — Lowenstein Sandler LLP

(57) ABSTRACT

A method and system for sending data in a file system that uses cryptographic signatures to protect data integrity. A computer system calculates a signature based on the content of a page of a memory. The memory is shared by processes that run on the computer system. The computer system write-protects the page while the page is used for calculation of the signature. When a first process attempts to modify the page, a page fault is triggered. In response to the page fault, the content of the page in memory is copied to a new page in the memory. The new page is accessible by the processes. Access to the page by the first process is redirected to the new page. Subsequent to the page fault, access to the page by the second process is also redirected to the new page.

18 Claims, 5 Drawing Sheets

(BEFORE WRITE ACCESS TO OLD_PAGE)

(AFTER AN ATTEMPT TO WRITE TO OLD_PAGE)

PERFORMING ZERO-COPY SENDS IN A NETWORKED FILE SYSTEM WITH CRYPTOGRAPHIC SIGNING

TECHNICAL FIELD

Embodiments of the present invention relate to memory management of a computer system. More specifically, the embodiments relate to a system and method for protecting a page of memory from modification during use for signature calculation. Other embodiments relate to a system and method for ensuring that the data (e.g., data in a file) is in a consistent state without requiring copying of the data, before sending and/or writing it to disk.

BACKGROUND

Many network-based file systems use cryptographic signatures to ascertain the validity of packets being sent to and from a file server. For example, when a client sends a packet to the file server, the client calculates a signature using the data in the packet and attaches the signature to the packet. During the signature calculation, the client must not allow the data, from which the signature is calculated, to change. However, in a shared memory architecture, the client can run multiple processes that share the data. Some of the processes may need to modify the data during and/or after the signature calculation, but before the data is sent. The period of time during and/or after the signature calculation, before the data is sent, may be referred to as a "stable data period." System performance will be degraded if these processes are forced to stall until the calculation is completed and the data is sent.

Conventionally, a client copies all of the data (which is to be sent to a file server) into a separate buffer before signature calculation starts. Copying all of the data is inefficient and slow. In scenarios where none of the processes modify the data (e.g., the processes only read the data or do not modify the data) during the stable data period, performing the data copying is not only unnecessary, but also wastes system resources. However, in a conventional client computer system where the address space of the processes is memory-mapped, the operating system kernel generally has no way of knowing if and when the data is going to be modified.

Other client computer systems use a method known as copy-on-write, which makes a copy of a shared page when a process attempts to modify the shared page. However, with copy-on-write, only the process performing the write operation will have access to the new copy. Thus, none of the other processes can share the content of the new copy.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for sending data in a file system that uses cryptographic signatures to protect data integrity. In one embodiment, a computer system calculates a signature based on the content of a page of a memory. The memory is shared by processes that run on the computer system. The computer system write-protects the page while the page is used for calculation of the signature. The page is write protected until the signature is calculated and the page send is complete. When a first process attempts to modify the page, a page fault is triggered. In response to the page fault, the content of the page is copied to a new page in the memory. The new page is accessible by the processes. Access to the page by the first process is redirected to the new page. Subsequent to the page fault, access to the page by a second process is also redirected to the new page. In another embodiment, the computer system may ensure that data (e.g., data in a file) is in a consistent state without requiring copying of the data, before sending and/or writing the data to storage (e.g., ensure that the data is in a consistent state during the stable data period).

Although the use of cryptographic signatures is described herein, this is provided for illustration only and various other uses are possible without loss of generality. The systems and methods described herein may generally be used to enforce the stability of data (e.g., ensure consistency of data) in a memory for a period of time. In other embodiments, enforcing the stability of data may be used for a variety of other uses/purposes. For example, the systems and methods described herein may enforce the stability of data to prevent accidental overwrites of the data and/or to prevent malicious overwrites of the data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
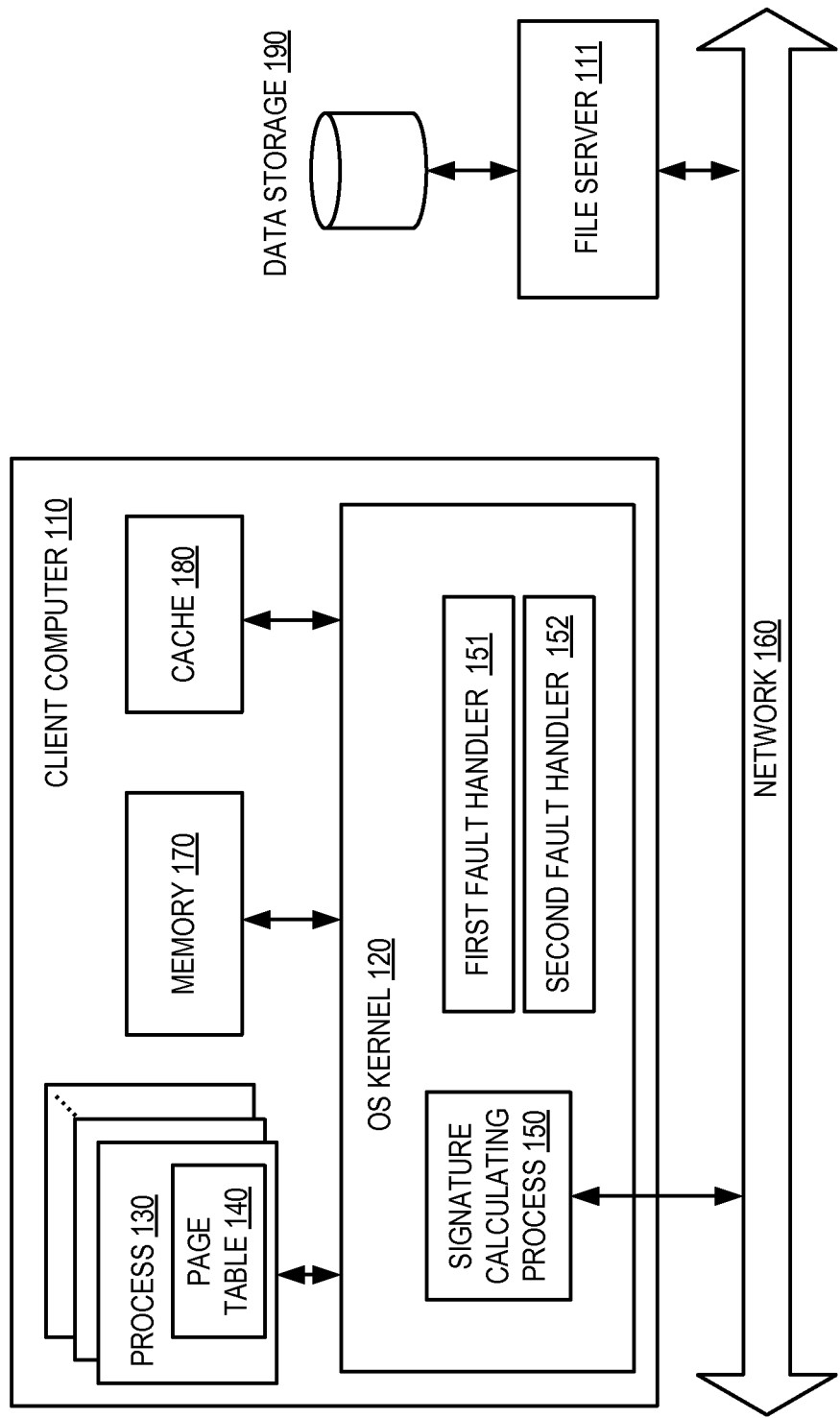
FIG. 1 is a block diagram of one embodiment a client computer system.

FIG. 1 is a block diagram that illustrates an embodiment of a client computer 110 coupled to a file server 111 over a network 160. The client computer 110 runs multiple processes 130, and each process 130 maintains a page table 140 that stores a mapping between addresses in that process's address space and addresses in the host address space (i.e., the address space of the client computer 110). The client computer 110 also runs an operating system (OS) kernel 120 to manage system resources (e.g., processors, data storage, or similar resources) for the processes. Examples of the client computer 110 include, but are not limited to, a server computer, a workstation, a personal computer (PC), a portable computing device, a personal digital assistant (PDA), or similar computing devices. The file server 111 can be one or more server computers that manage data storage 190 (e.g., disks). The network 160 can be a private network (e.g., a local area network (LAN), a wide area network (WAN), intranet, or similar communication networks) or a public network (e.g., the Internet).

In one embodiment, the client computer 110 includes a memory 170, which is shared by the processes 130. The memory 170 is divided into a number of pages, with each page having a fixed size (e.g., 4096 bytes). All of the processes 130 can read the same content of each page in the memory 170. When one of the processes 130 modifies a page in the memory 170, the modified content is visible to other processes 130. The client computer 110 also includes a cache 180, which provides fast access to some of the pages in the memory 170 (e.g., those pages that the OS kernel 120 expects to be used again).

In one embodiment, the client computer 110 sends data to the first server 111; e.g., for data storage. For security reasons, the client computer 110 runs a signature calculating process 150 that calculates a signature from the data and attaches that signature to the data for transmission over the network 160. The signature can be calculated by hashing the data. The data can be in the form of a file that spans one or more of pages in the memory 170. The page content needs to stay unchanged while the signature calculating process 150 is calculating the signature and until the page is sent. Therefore, in one embodiment, the OS kernel 120 write-protects the pages contained in the file during the calculation of the signature. In another embodiment, the OS kernel 120 may ensure that data (e.g., data in a file) is in a consistent state without requiring copying of the data, before sending and/or writing the data to storage (e.g., ensure that data is in a consistent state during the stable data period). In the meantime, the processes 130 can continue reading the pages. When any process 130 attempts to modify one of these write-protected pages, a copy of that page (referred to as a "new page") is made to a new location in the memory 170. Subsequent access (both read and write) to that page by any of the processes 130 is re-directed to the new page. If no process 130 needs to modify the page, no copy will be made. Thus, the client system 110 is able to avoid data copying in a scenario where no process needs to modify the pages of the file. In a scenario where a process needs to modify a page of the file, the client system 110 can perform data copying when a page fault is triggered by the write attempt of that process 130.

In one embodiment, the OS kernel 120 includes two page fault handlers: a first fault handler 151 and a second fault handler 152. The first fault handler 151 is invoked when any of the processes 130 attempts to access a write-protected page. Invoking the first fault handler 151 causes the content of the write-protected page (referred to as an "old page") to be copied to a new location (referred to as a "new page") in the memory 170. This new page can be modified by the processes 130 when the signature calculating process 150 calculates the signature using data in the old page. The first fault handler 151 also unmaps (i.e., removes the mapping of) the old page in the page tables 140 (for those page tables containing the mapping of the old page), such that subsequent access to the old page by the processes 130 will invoke the second fault handler 152. Invoking the second fault handler 152 causes the access to the old page to be re-directed to the new page. In one embodiment, the second fault handler 152 re-directs the access to a cached copy of the new page.

Figure 2A:
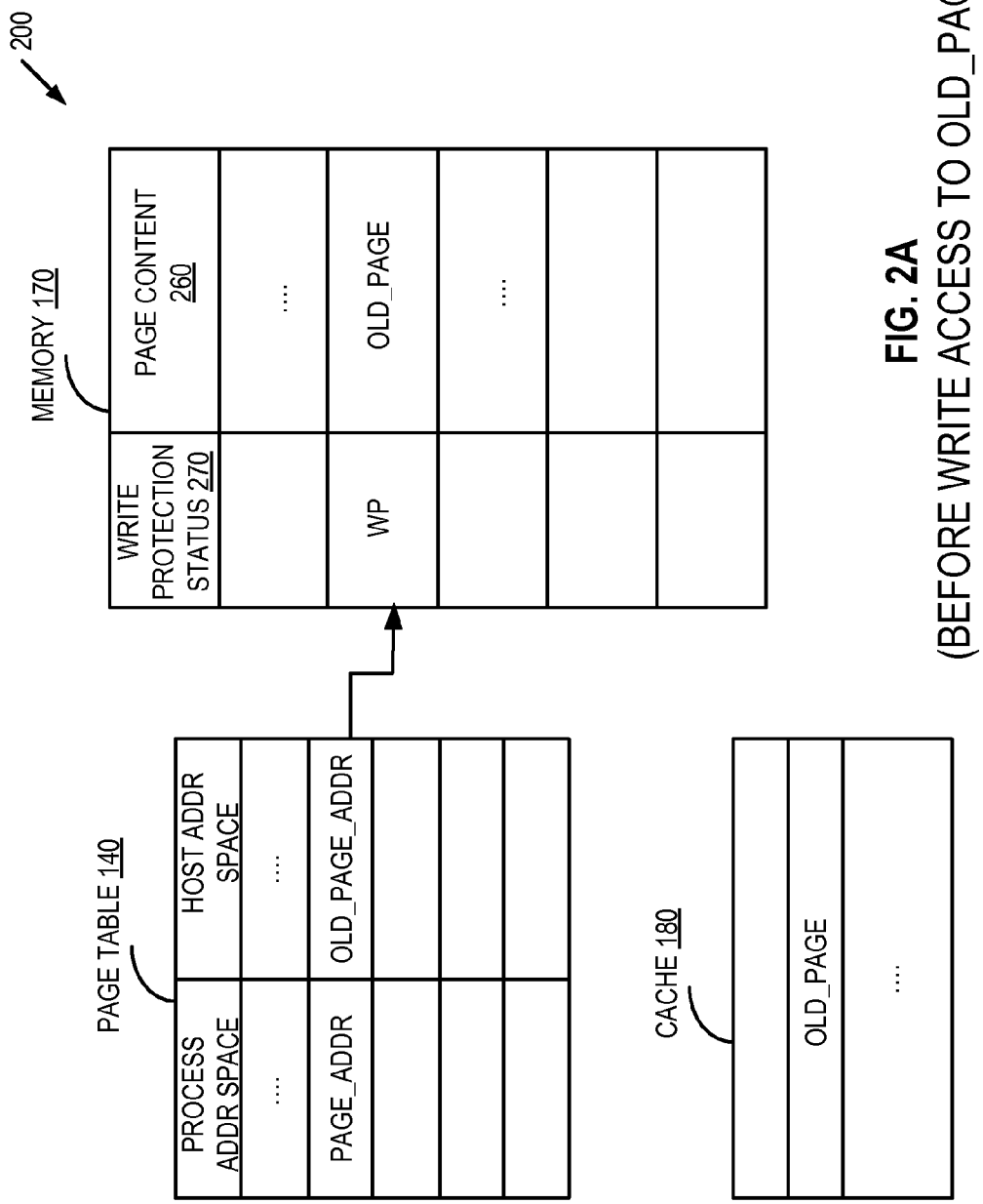
FIG. 2A is a diagram illustrating an example of memory allocation before a process attempts to write to an old page.

FIG. 2A illustrates an example of memory allocation 200 according to one embodiment of the present invention. In one embodiment, the page table 140 is maintained by a process (e.g., the process 130 of FIG. 1) to provide an address mapping that maps an address in the process address space (which is also a virtual memory address space) to an address in the host address space (which is also a physical address space of the memory 170. The memory 170 stores page content 260, and a write protection status 270 for each page. Although one page table is shown, it is understood that each of the processes sharing the memory 170 maintains a separate page table and the content of these page tables can be different.

In one embodiment, the memory allocation 200 is made during signature calculation before a process attempts to write to a page. Suppose that the signature calculation uses the content of an old page, which is write-protected (indicated as "WP" in the write protection status 270) to prevent modification. In one embodiment, each page is associated with an indicator (e.g., a 1-bit flag), that can be set to indicate that the page is being write-protected. A copy of the old page is stored in the cache 180 to provide fast access for read operations. The page table 140 stores a mapping that maps a process space address (PROC_ADDR) to the address of the old page (OLD_PAGE_ADDR). The OLD_PAGE_ADDR can be used to determine the location of the old page in the memory 170, as well as whether a copy of the old page is in the cache 180. If any process needs to read the content of the old page, it can use the page table 140 to locate the old page in the cache 180 or in the memory 170. Further, if none of the processes attempt to modify the old page, the write protection of the old page can be removed at the end of signature calculation, after the new page is sent, without incurring any data copying. In one embodiment, the memory allocation 200 may ensure that data (e.g., data in a file) is in a consistent state without requiring copying of the data, before sending and/or writing the data to storage (e.g., ensure that data is in a consistent state during the stable data period).

Figure 2B:
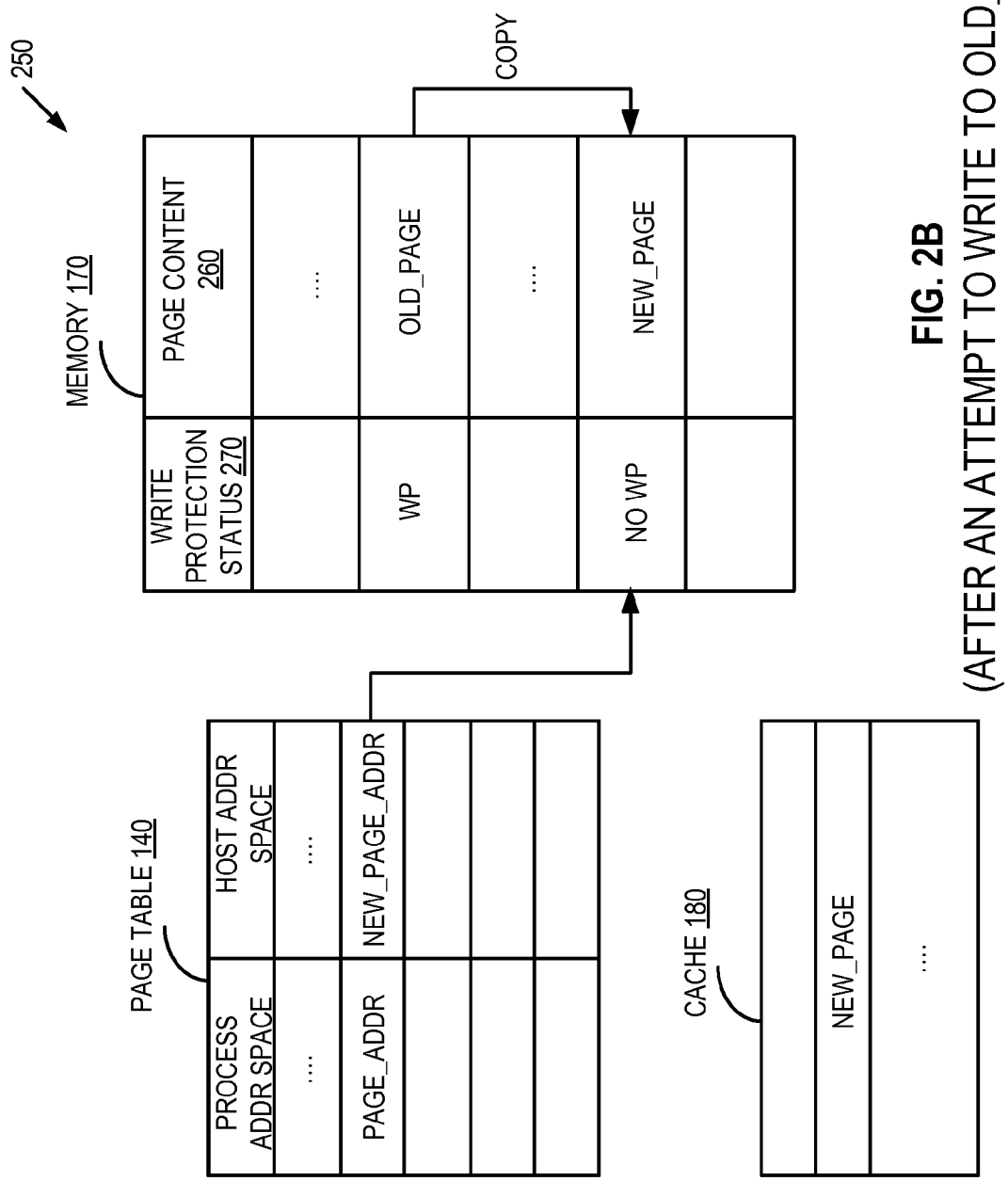
FIG. 2B is a diagram illustrating an example of memory allocation after a process attempts to write to an old page

FIG. 2B illustrates an example of memory allocation 250 according to one embodiment of the present invention. In one embodiment, the memory allocation 250 is made during signature calculation after a process attempts to write to a page. When a process attempts to modify a write-protected page (e.g., the old page), a first page fault is triggered due to the access to a write-protected page. A corresponding page fault handler (e.g., the first fault handler 151) is invoked to perform a sequence of operations. The sequence of operations can include: requesting that memory be allocated to a new page, copying the old page (referred to as an "old page") to the new page, replacing the old page in the cache 180 with the new page, unmapping the old page in those page tables that contain the mapping of the old page, and other similar operations. The new page contains the same data as the old page, but the new page is not write-protected (indicated as "NO WP" in the write protection status 270).

Thereafter, when the same process or a different process attempts to access (read or write) the old page (e.g., which has been unmapped in the page table of that process), a second page fault is triggered due to the access to an unmapped page. A corresponding page fault handler (e.g., the second fault handler 152) is invoked to perform a sequence of operations. The sequence of operations can include mapping the new page into the page table 140 of the process that attempts to access the old page, redirecting the access to the cached copy of the new page, and other similar operations. At this point, the page table 140 contains a mapping that maps the same PAGE_ADDR in the process address space (which was mapped to the old page before the write attempt) to the new page address ("NEW_PAGE_ADDR"). The NEW_PAGE_ADDR can be used to determine the location of the new page in the memory 170, as well as whether a copy of the new page is in the cache 180. The old page in the memory 170 is accessible by the signature-calculating process (e.g., the sending process 150 of FIG. 1) only. After the signature is calculated and the new page is sent, the old page in the memory signature calculating can be discarded. In one embodiment, the memory allocation 250 may ensure that data (e.g., data in a file) is in a consistent state without requiring copying of the data, before sending and/or writing the data to storage (e.g., ensure that data is in a consistent state during the stable data period).

Figure 3:
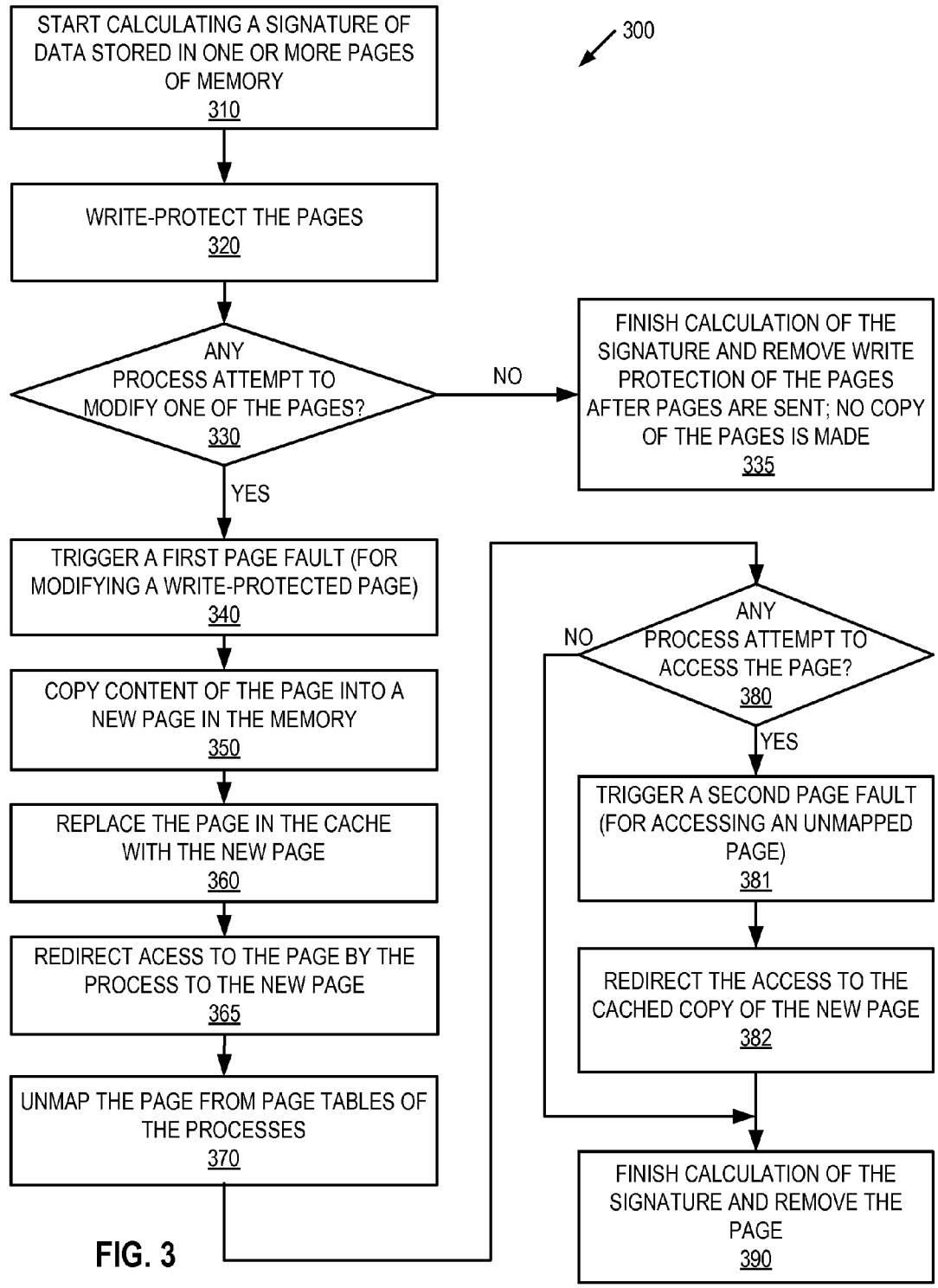
FIG. 3 is a flow diagram of one embodiment of a method for managing write-protected data according to one embodiment of the invention.

FIG. 3 is a flow diagram illustrating a method 300 for managing write-protected pages according to one embodiment of the invention. The method 300 may be performed by a computer system 400 of FIG. 4 that may comprise hardware (e.g., circuitry, dedicated logic, programmable logic, microcode, or other similar hardware), software (e.g., instructions run on a processing device), or a combination thereof. In one embodiment, the method 300 is performed by the client computer 110 of FIG. 1.

Referring to FIG. 1 and FIG. 3, in one embodiment, the method 300 begins when the client computer 110 starts calculating the signature of data that is stored in one or more pages of the memory 170 (block 310). The client computer 110 write-protects the pages (block 320). If any of the processes 130 attempts to modify one of the pages (the "old page") during the signature calculation (block 330), a first page fault is triggered due to the attempted access to a write-protected page (block 340). If none of the processes 130 attempt to modify the pages during the signature calculation (block 330), the write protection to the pages is removed at the completion of the signature calculation and after the pages are sent, and no data copying is performed (block 335).

In one embodiment, continuing from block 330 when one of the processes 130 (e.g., a first process) attempts to modify the old page, the first page fault is triggered and the first fault handler 151 (of FIG. 1) is invoked. The first fault handler 151 requests memory allocation to a new page and copies the content of the old page into the new page (block 350). The first fault handler 151 also replaces the old page in the cache 180 with the new page (block 360). At this point, the first process can be re-directed to the new page (e.g., the cached copy of the new page) (block 365). The first fault handler 151 also unmaps the old page in those page tables 140 that contain the mapping of the old page (block 370). After the old page is unmapped, if none of the processes 130 attempt to access (read or write to) the old page (block 380), the old page in the memory 170 is removed upon the completion of the signature calculation (block 390). However, if any of the processes 130 attempt to access the old page (block 380) after the old page is unmapped, a second page fault is triggered due to the attempted access to an unmapped page (block 381). The second page fault invokes the second fault handler 152 (of FIG. 1), which redirects the access to the cached copy of the new page (block 382). At the completion of the signature calculation, the old page in the memory 170 is removed (block 390). In one embodiment, the method 300 may ensure that data (e.g., data in a file) is in a consistent state without requiring copying of the data, before sending and/or writing the data to storage (e.g., ensure that data is in a consistent state during the stable data period).

Figure 4:
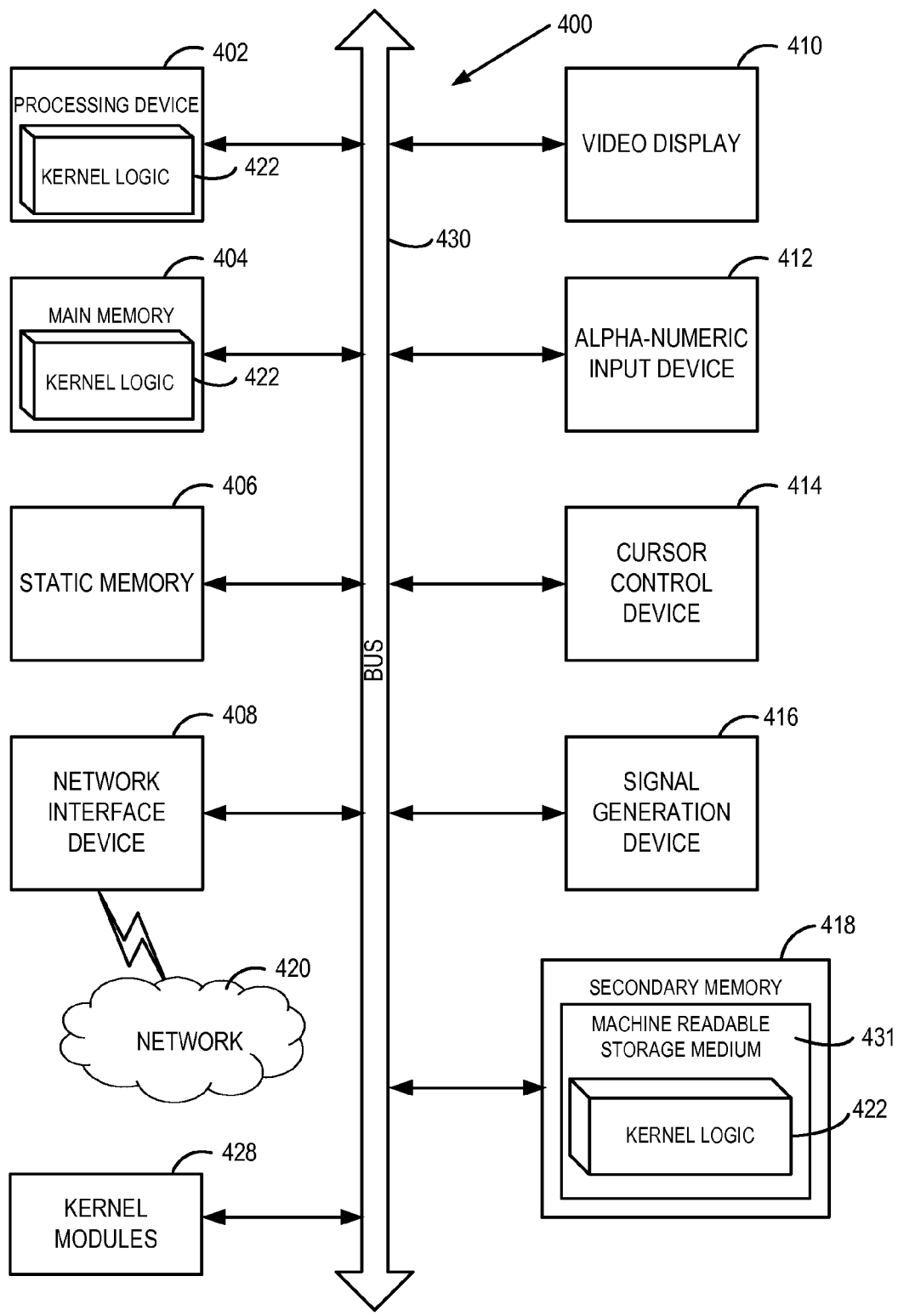
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), or other variations of memory), a static memory 406 (e.g., flash memory, static random access memory (SRAM), other variations of static memory), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute kernel logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a non-transitory computer readable storage medium 431) on which is stored one or more sets of instructions (e.g., the kernel logic 422) embodying any one or more of the methodologies or functions described herein (e.g., the OS kernel 120 of FIG. 1). The kernel logic 422 may also reside, completely or at least partially, within the main memory 404 and/or within the processing device 402 during execution thereof by the computer system 400; the main memory 404 and the processing device 402 also constituting machine-readable storage media. The kernel logic 422 may further be transmitted or received over a network 420 via the network interface device 408.

The non-transitory computer readable storage medium 431 may also be used to store the kernel logic 422 persistently. While the non-transitory computer readable storage medium 431 is shown in an exemplary embodiment to be a single medium, the term "non-transitory computer readable storage medium" should be taken to include a single medium or multiple media (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 400 may additionally include kernel modules 428 for implementing the functionalities of the OS kernel 120 of FIG. 1. The module 428, components and other features described herein (for example in relation to FIG. 1) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating," "copying," "redirecting," "unmapping," "triggering," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   generating a page fault, by the computer system that hosts processes, in response to an attempt of a first of the processes to modify a page of a memory while the page is being used by a signature calculating process for calculation of a signature;
   copying, by the computer system in response to the page fault, content of the page from the memory to a new page in the memory during the calculation of the signature, the new page being accessible by the processes;
   redirecting, by the computer system, access to the page by the first process to the new page;
   detecting, by the computer system subsequent to the page fault, a second of the processes attempting to access the page in the memory; and
   redirecting, by the computer system, access to the page by the second process to the new page.

2. The method of claim 1, wherein prior to the page fault, the second process maintains a page table storing a mapping that maps a process address of the page in a memory space allocated to the second process to a host address of the page in the memory, wherein copying the content of the page further comprises:
   unmapping the page from the page table of the second process.

3. The method of claim 2, wherein after unmapping the page, the method further comprises:
   in response to an attempt of accessing the page by the second process, triggering a second page fault; and
   adding an entry to the page table of the second process, wherein the entry maps the process address to a new host address of the new page in the memory.

4. The method of claim 1, wherein copying the content of the page further comprises:
   replacing the page in a cache of the computer system with the new page, the cache being accessible to the processes.

5. The method of claim 1, wherein redirecting access to the page by the first process further comprises:
   redirecting the access to a cached copy of the new page.

6. The method of claim 1, wherein, prior to the generating, the method further comprises:
   setting an indicator associated with the page to write-protect the page in the memory.

7. A system comprising:
   a memory shared by processes that run on a computer system; and
   a processing device coupled to the memory to run the processes, the processing device adapted to generate a page fault in response to an attempt of a first of the processes to modify a page of the memory during calculation of a signature by a signature calculating process, wherein the calculation is based on content of the page, copy the content of the page, in response to the page fault, from the memory to a new page in the memory during calculation of the signature, wherein the new page is accessible by the processes, wherein the processing device is further adapted to redirect access to the page by the first process to the new page, detect a second of the processes which attempts to access the page in the memory subsequent to the page fault, and redirect access to the page by the second process to the new page.

8. The system of claim 7, wherein, prior to the page fault, the second process maintains a page table, which stores a mapping that maps a process address of the page in a memory space allocated to the second process to a host address of the page in the memory, wherein, in response to the page fault, the processing device is further adapted to unmap the page from the page table of the second process.

9. The system of claim 8, wherein, after the page is unmapped, the processing device is further adapted to, in response to an attempt to access the page, trigger a second page fault and add an entry to the page table of the second process, wherein the entry maps the process address to a new host address of the new page in the memory.

10. The system of claim 7, further comprising:
a cache, accessible by the processes and coupled to the processing device, to store the page before the page fault, wherein the page in the cache is replaced with the new page in response to the page fault.

11. The system of claim 7, further comprising:
a cache coupled to the processing device, wherein the access to the page is redirected to a cached copy of the new page in the cache.

12. The system of claim 7, wherein no copy of the page is made when none of the processes attempt to modify the page during calculation of the signature.

13. A computer readable device comprising a storage medium having stored therein instructions that, when executed by a computer system that hosts processes, cause the computer system to perform a method comprising:
generating a page fault, by the computer system, in response to an attempt of a first of the processes to modify a page of a memory while the page is being used by a signature calculating process for calculation of a signature;
copying, in response to the page fault, content of the page from the memory to a new page in the memory during the calculation of the signature, the new page being accessible by the processes;
redirecting access to the page by the first process to the new page;
detecting, subsequent to the page fault, a second of the processes attempting to access the page in the memory; and
redirecting access to the page by the second process to the new page.

14. The computer readable device of claim 13, wherein prior to the page fault, the second process maintains a page table storing a mapping that maps a process address of the page in a memory space allocated to the second process to a host address of the page in the memory, and wherein copying the content of the page further comprises:
unmapping the page from the page table of the second process.

15. The computer readable device of claim 14, wherein after unmapping the page, the method further comprises:
in response to an attempt of accessing the page by the second process, triggering a second page fault; and
adding an entry in the page table of the second process, wherein the entry maps the process address to a new host address of the new page in the memory.

16. The computer readable device of claim 13, wherein copying content of the page further comprises:
replacing the page in a cache of the computer system with the new page, the cache being accessible to the processes.

17. The computer readable device of claim 13, wherein redirecting access to the page by the first process further comprises:
redirecting the access to a cached copy of the new page.

18. The computer readable device of claim 13, wherein copying content of the page further comprises:
removing the page from the memory after the calculation of the signature is completed.

* * * * *